(12) United States Patent  
Takahashi et al.

(10) Patent No.: US 12,022,048 B2
(45) Date of Patent: Jun. 25, 2024

(54) DISPLAY UNIT COLOR-CORRECTION METHOD

(71) Applicant: DIC Corporation, Tokyo (JP)

(72) Inventors: Masato Takahashi, Tokyo (JP); Norimichi Tsumura, Chiba (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/248,767

(22) PCT Filed: Oct. 5, 2021

(86) PCT No.: PCT/JP2021/036796
§ 371 (c)(1),
(2) Date: Apr. 12, 2023

(87) PCT Pub. No.: WO2022/080185
PCT Pub. Date: Apr. 21, 2022

(65) Prior Publication Data
US 2023/0403365 A1   Dec. 14, 2023

(30) Foreign Application Priority Data

Oct. 13, 2020   (JP) ................................ 2020-172624

(51) Int. Cl.
*H04N 1/60* (2006.01)
(52) U.S. Cl.
CPC ......... *H04N 1/6027* (2013.01); *H04N 1/6055* (2013.01); *H04N 1/608* (2013.01);
(Continued)
(58) Field of Classification Search
CPC ...... H04N 1/6033; H04N 1/6086; H04N 1/60; H04N 9/64; H04N 1/603; H04N 9/643;
(Continued)

(56) References Cited

U.S. PATENT DOCUMENTS 5,218,671 A  *  6/1993  Liao ........................ H04N 1/62
                                                       345/428
5,917,611 A  *  6/1999  Sakai ................. H04N 1/32122
                                                       358/444

(Continued)

FOREIGN PATENT DOCUMENTS

JP          2016-6954 A       1/2016
JP        2017-528975 A       9/2017

OTHER PUBLICATIONS

Masahiro Nishibori, "Problems and Solutions in Medical Color Imaging", Proceedings of the Second International Symposium on Multispectral Imaging and High Accurate Color Reproduction, Oct. 2000, p. 9-17 (9 pages).

*Primary Examiner* — Negussie Worku
(74) *Attorney, Agent, or Firm* — Osha Bergman Watanabe & Burton LLP

(57) ABSTRACT

A display unit color-correction method includes: a first step of displaying a prescribed image on a display unit of a portable communication terminal that includes an imaging unit and the display unit; a second step of acquiring imaging data by imaging a color chart, which is a printed matter, and the display unit with the prescribed image displayed thereon together or individually by the imaging unit; and a third step of correcting a color of the display unit by using color information on the prescribed image in the imaging data and color information on a color in the color chart in the imaging data.

7 Claims, 7 Drawing Sheets

(52) U.S. Cl.
CPC ............... *H04N 2201/3257* (2013.01); *H04N 2201/326* (2013.01)

(58) Field of Classification Search
CPC ........ H04N 9/73; H04N 23/12; H04N 1/6008; H04N 1/6058; H04N 2201/0094; H04N 1/6027; H04N 1/6055; H04N 1/608; H04N 2201/3257; H04N 2201/326; G06T 2207/10024; G06T 7/90; G06T 2207/30168; G06T 5/001; G06T 7/0002; G06T 1/00; G06T 2207/30108; A61B 10/0038; A61B 10/007; A61B 2560/0475; A61B 2562/08; A61B 2562/12; A61B 2576/02; A61B 5/0013; A61B 5/0022; A61B 5/0077; A61B 5/14507; A61B 5/14517; A61B 5/14532; A61B 5/14546; A61B 5/1477; A61B 5/150022; A61B 5/150358; A61B 5/150854; A61B 5/150969; A61B 5/155; A61B 5/157; A61B 5/6808; A61B 5/6898; A61B 5/7221; A61B 5/7246; A61B 5/7282; A61B 5/742; A61B 5/7435; G16H 40/63; G16H 50/20; G01J 3/52; A61N 2005/0628; A61N 5/0618
USPC ....................................................... 358/518
See application file for complete search history.

(56) References Cited

U.S. PATENT DOCUMENTS

| | | | | |
|---|---|---|---|---|
| 8,655,068 | B1* | 2/2014 | Li | H04N 1/00031 |
| | | | | 382/128 |
| 8,967,468 | B2* | 3/2015 | Gomez | G07F 19/20 |
| | | | | 235/462.43 |
| 2004/0196250 | A1* | 10/2004 | Mehrotra | H04N 9/73 |
| | | | | 348/E17.005 |
| 2004/0208811 | A1* | 10/2004 | Anflo | B01J 23/02 |
| | | | | 423/263 |
| 2007/0030505 | A1* | 2/2007 | Ito | H04N 1/6033 |
| | | | | 358/1.9 |
| 2007/0188782 | A1* | 8/2007 | Sakurai | H04N 1/6055 |
| | | | | 358/1.9 |
| 2012/0082374 | A1* | 4/2012 | Agarwal | H04N 1/6033 |
| | | | | 382/162 |
| 2013/0141579 | A1* | 6/2013 | Schofield | B60C 23/0406 |
| | | | | 348/148 |
| 2014/0209682 | A1* | 7/2014 | Gottwals | G06T 9/00 |
| | | | | 235/454 |
| 2014/0232879 | A1* | 8/2014 | Gottwals | H04N 17/002 |
| | | | | 348/188 |
| 2014/0232923 | A1* | 8/2014 | Koh | G01J 3/0264 |
| | | | | 345/589 |
| 2015/0348245 | A1* | 12/2015 | Horiuchi | G06T 5/005 |
| | | | | 382/167 |
| 2016/0111062 | A1* | 4/2016 | Hicks | G06T 5/007 |
| | | | | 345/589 |
| 2019/0089868 | A1* | 3/2019 | Nakahara | H04N 1/6033 |
| 2019/0301394 | A1* | 10/2019 | Knollmayr | F01P 3/02 |
| 2021/0004989 | A1* | 1/2021 | Tanaka | G06T 5/001 |

* cited by examiner

DISPLAY UNIT COLOR-CORRECTION METHOD

TECHNICAL FIELD

The present invention relates to a display unit color-correction method.

BACKGROUND ART

Color-correction is considered to be important in telemedicine, in the field of design, and WEB marketing.

In the telemedicine, it is important to correctly display an image imaged by a patient on a display at a side of a medical doctor.

For example, the degree of redness differs between a normal case (in a case where no inflammatory is caused) and a case where inflammatory is caused, and when the difference cannot be correctly displayed, it leads to an erroneous diagnosis.

This is pointed out in NPL-1.

In the design as well, when the color intended by a designer is not correctly displayed, the design intended by the designer cannot be made known.

In the WEB marketing as well, when provision-side information is not correctly displayed, it results in returned goods and the like to increase social costs.

Herein, the telemedicine is performed, in addition to a diagnostic inquiry by telephone or the like, by using an information communication system, such as a conference system, capable of transmitting and receiving an image, and observing a patient by a diagnosing person such as a medical doctor.

In medical care, medical care that places greater importance on colors is performed in some cases. For example, the observation of the color of the gum in dentistry, the observation of the color of the skin in dermatology, the observation of the color of the throat in otolaryngology, and the medical examination (inspection) for the skin color, the tongue color, and the like, which is performed in Chinese medicine, can be included. In such medical care, the recognition of the color is incorrectly performed to affect the diagnoses in some cases.

Therefore, when such medical care is performed by telemedicine, it is important to accurately recognize the colors.

International Commission on Illumination (CIE) has standardized the practical color reproduction systems. However, in a case where the color reproduction is actually performed, the color reproduction cannot be easily performed due to the use of calibration equipment, the installation of software, and the like.

In particular, in a case where a mobile terminal such as a smartphone is used in telemedicine or the like, the equipment needs to be used for every mobile terminal and software needs to be installed, which causes large burden on a user, so that the use of the mobile terminal in telemedicine or the like has not been spread.

CITATION LIST

Non Patent Literature

NPL 1: Nishibori, Masahiro. "Problems and solutions in medical color imaging." Proceedings of the Second International Symposium on Multi-Spectral Imaging and High Accurate Color Reproduction. 2000.

SUMMARY OF INVENTION

Technical Problem

Therefore, the present inventors have been discussed about a method of easily performing color-correction to a display unit of a portable communication terminal that is used by an observer who carries out observation by using a color chart in telemedicine or the like.

In other words, the invention aims to provide a display unit color-correction method capable of performing color-correction to a display unit of a portable communication terminal that is used by an observer who carries out observation by using a color chart, which is a printed matter.

Solution to Problem

The present inventors have intensively studied to solve the above-mentioned problems, and have found an easy method capable of performing color-correction to a portable communication terminal only with a color chart, which is a printed matter, without by using calibration equipment, as a result.

Specifically, the present inventors have found that imaging data obtained by imaging a color chart, which is a printed matter, and a prescribed image displayed on a display unit is used to allow color-correction to the display unit of the portable communication terminal that is used by the observer who holds the color chart, which is the printed matter, and have completed the invention.

In other words, the invention includes the following aspects.

[1] A display unit color-correction method including:
   a first step of displaying a prescribed image on a display unit of a portable communication terminal that includes an imaging unit and the display unit;
   a second step of acquiring imaging data by imaging a color chart, which is a printed matter, and the display unit with the prescribed image displayed thereon together or individually by the imaging unit; and
   a third step of correcting a color of the display unit by using color information on the prescribed image in the imaging data and color information on a color in the color chart in the imaging data.

[2] The display unit color-correction method according to [1], in which
   the prescribed image includes a color that is obtained by imaging a second color chart, which is a printed matter, including a patch serving as a prescribed color, under a standard light source,
   the second step is a step of acquiring the imaging data by imaging the color chart, which is the printed matter, and the display unit with the prescribed image displayed thereon together by the imaging unit, and
   the third step is a step of causing, by using color information on a color that is obtained by imaging the second color chart under the standard light source in the imaging data and color information on a color in the color chart in the imaging data, a color in the second color chart to be displayed on the display unit in imaging data that is obtained by displaying thereafter the second color chart on the display unit and imaging the display unit by the imaging unit to approach or match the color in the color chart in the imaging data.

[3] The display unit color-correction method according to [1], in which
the prescribed image includes the color in the color chart,
the second step is a step of acquiring the imaging data by imaging the color chart, which is the printed matter, and the display unit with the prescribed image displayed thereon together by the imaging unit, and
the third step is a step of causing, by using color information on the color in the color chart that is included in the prescribed image in the imaging data and color information on the color in the color chart, which is the printed matter, in the imaging data, the color in the color chart that is included in the prescribed image to be displayed on the display unit in imaging data that is obtained by displaying thereafter the prescribed image on the display unit and imaging the display unit by the imaging unit to approach or match the color in the color chart, which is the printed matter, in the imaging data.
[4] The display unit color-correction method according to [2] or [3], in which
the second step is a step of acquiring the imaging data by reflecting the color chart, which is the printed matter, and the display unit with the prescribed image displayed thereon together in a mirror, and imaging the color chart, which is the printed matter, and the display unit reflected in the mirror by the imaging unit, or
the imaging unit is an imaging unit that is externally attached to the portable communication terminal, and the second step is a step of acquiring the imaging data by imaging the color chart, which is the printed matter, and the display unit with the prescribed image displayed thereon together by the externally attached imaging unit.
[5] The display unit color-correction method according to claim [1], in which
the prescribed image includes a prescribed color,
the first step, and the imaging of the display unit at the second step are respectively performed a plurality of times by changing the prescribed color, and
the third step is a step of correcting the color of the display unit, by using color information on a plurality of prescribed colors in the imaging data acquired at the second step, and the color information on the color in the color chart in the imaging data.
[6] The display unit color-correction method according to [5], in which at the second step, the color chart, which is the printed matter, and the display unit are individually imaged by the imaging unit.

Advantageous Effects of Invention

With the invention, it is possible to provide a display unit color-correction method that can perform color-correction to a display unit of a portable communication terminal that is used by an observer who carries out observation by using a color chart, which is a printed matter.

DESCRIPTION OF EMBODIMENTS

Figure 1:
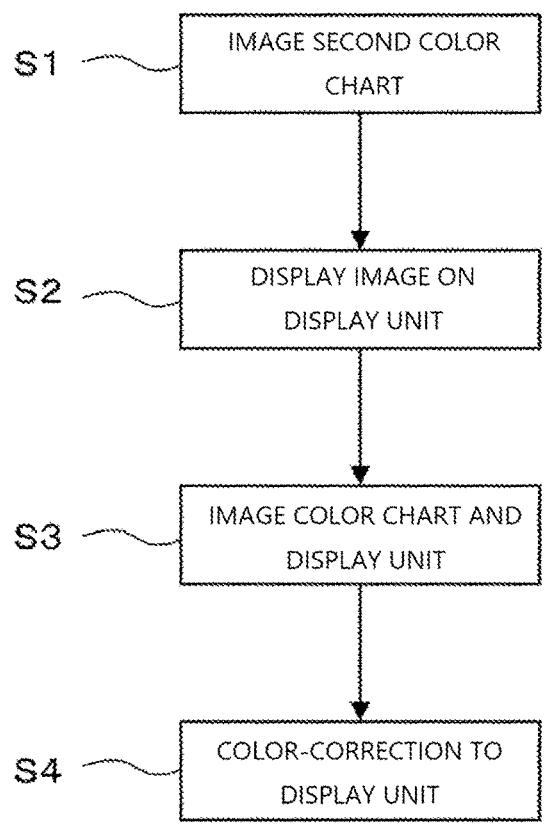
FIG. 1 is a flowchart of one example of a display unit color-correction method.

Hereinafter, a display unit color-correction method of the invention will be described in detail, however, the description of the constituent elements described below is one example as an embodiment of the invention, and the invention is not limited to these contents.

Display Unit Color-Correction Method

The display unit color-correction method of the invention includes a first step, a second step, and a third step, and further includes other steps if necessary.
<First Step>
The first step is not specially limited as long as it is a step of displaying a prescribed image on a display unit of a portable communication terminal.
In a case where the brightness of the display unit of the portable communication terminal can be changed, the brightness of the display unit when the prescribed image is caused to be displayed is preferably adjusted to the brightness of the display unit when an observer observes an image displayed on the display unit while keeping a color chart, which is a printed matter, on hand. With such an adjustment, a more correction effect by the color-correction can be obtained.
<<Prescribed Image>>
Examples of the prescribed image can include an image including a prescribed color. Examples of such an image can include an image including a color (patch color) obtained by imaging a color chart (hereinafter, referred to as "second color chart"), which is a printed matter. The imaging is preferably performed under a standard light source. Examples of the standard light source can include a D50 light source and a D65 light source.
The second color chart includes a patch serving as a prescribed color. The number of patches in the second color chart is not specially limited as long as it is one or more.

Moreover, the prescribed image may be an image not including a color that is obtained by imaging a color chart, which is a printed matter, but including a color (patch color) in a color chart, which is a printed matter, and is used at the second step, which is described later. Color information on such a color may be color information that is described in advance in an instruction manual and the like as color information on the color in the color chart, or may be color information on the color that is obtained by measuring the color in the color chart by a colorimeter.

The prescribed image is not an image arbitrarily or randomly created, but indicates an image in which color information to be used in the color-correction to the display unit is grasped in advance, for example.

The prescribed image preferably includes a recognition marker for recognizing a prescribed color in order to easily recognize the prescribed color in the imaging data that is obtained by imaging the display unit by an imaging unit.

The area of the second color chart, the prescribed color, and the colors in the color chart in the prescribed image is not specially limited, but is preferably 30% or less, more preferably 20% or less, and specially preferably 15% or less. The lower limit is preferably 5% or more.

Moreover, in the prescribed image to be displayed on the display unit, a location other than the second color chart, the prescribed color, the colors in the color chart, and the recognition marker preferably has a dark color, and more preferably has a black color.

In the prescribed image to be displayed on the display unit, the area of the second color chart, the prescribed color, and the colors in the color chart is small and the location other than the second color chart, the prescribed color, and the colors in the color chart has a dark color, so that the light emission amount of the display unit that is spontaneously emitting light decreases, and affecting a color tone of the imaging data by the spontaneous light can be reduced, as a result.

From the above, the area of the second color chart, the prescribed color, and the colors in the color chart in the prescribed image is preferably small.

Meanwhile, when the area of the second color chart, the prescribed color, and the colors in the color chart is too small, accurately imaging the color in a relevant region in the imaging becomes difficult in some cases. Therefore, the area of the second color chart, the prescribed color, and the colors in the color chart in the prescribed image is preferably 5% or more.

<<Portable Communication Terminal>>

The portable communication terminal includes the imaging unit and the display unit, and further includes other units if necessary.

The imaging unit is, for example, a camera. Examples of imaging elements included in the imaging unit can include a charge coupled device (CCD) and a complementary metal oxide semiconductor (CMOS).

Examples of the display unit can include a liquid crystal display or an organic EL display. The size of the display unit is not specially limited.

Examples of the portable communication terminal can include a mobile telephone, a smartphone, and a tablet terminal.

<Second Step>

The second step is not specially limited as long as it is a step of acquiring imaging data by imaging a color chart, which is a printed matter, and the display unit with a prescribed image displayed thereon together or individually by the imaging unit.

In a case where the prescribed image is an image including a color that is obtained by imaging a second color chart, which is a printed matter, the color chart that is imaged at the second step and the second color chart are normally the same color charts in which the same patches are disposed. Note that, the relevant color chart and the second color chart may be one color chart or may be two identical color charts.

The colors of the patches in the color chart and the second color chart basically have a yellow color, a vermilion color, and an indigo blue color, and may preferably include different five colors that are respectively different in the hue, the saturation, and the lightness.

At the second step, the color chart, which is the printed matter, and the display unit may be together reflected in a mirror, and the color chart and the display unit reflected in the mirror may be imaged by the imaging unit.

The size of the mirror is not specially limited.

Moreover, at the second step, the color chart, which is the printed matter, and the display unit with the prescribed image displayed thereon may be imaged together or individually by an externally attached imaging unit.

Moreover, in a case where a prescribed image includes the color in a color chart, the second step is, for example, a step of acquiring imaging data by imaging the color chart, which is the printed matter, and the display unit with the prescribed image displayed thereon together by the imaging unit.

Note that, the imaging unit included in the portable communication terminal may be an imaging unit that is integrated with a portable communication terminal main body, or may be an imaging unit that is externally attached to portable communication terminal main body. In a case where the portable communication terminal is a smartphone, for example, an in-camera of the smartphone corresponds to the imaging unit as the imaging unit that is integrated with the portable communication terminal main body. The externally attached imaging unit is communicable with the portable communication terminal via wired communication or wireless communication, for example, and imaging data acquired resulting from the imaging by the externally attached imaging unit is transmitted to the portable communication terminal main body via the wired communication or the wireless communication.

The imaging data to be obtained at the second step may be a still image or may be a moving image.

The first step and the second step may be performed a plurality of times by changing a prescribed color.

The number of the prescribed colors in the case where the first step and the second step are performed the plurality of times by changing the prescribed color is not specially limited, but may be 50 or more, may be 1000 or more, or may be 10000 or more, for example. Moreover, the upper limit is not specially limited, but may be 20000000 or less, for example.

For example, in 8-bit RBG values (0, 0, 0) to (255, 255, 255), in a case where a prescribed color is created by changing the luminance of R by 8 from (0, 0, 0), a prescribed color is created by changing the luminance of B by 8 from (0, 0, 0), and a prescribed color is created by changing the luminance of G by 8 from (0, 0, 0), the number of the prescribed colors becomes (256/8)+(256/8)+(256/8)=96.

Moreover, for example, in the 8-bit RBG values (0, 0, 0) to (255, 255, 255), in a case where a prescribed color is created by changing the luminance of each of R, B, and G by 1, the number of the prescribed colors becomes 256×256×256=16777216. Moreover, in a case where a prescribed color is created by changing the luminance of each of R, B, and G by 8, the number of the prescribed colors becomes (256/8)×(256/8)×(256/8)=32768.

<Third Step>

The third step is not specially limited as long as it is a step of correcting the color of the display unit by using color information on a prescribed image in the imaging data and information on a color in the color chart in the imaging data.

In a case where the prescribed image includes a color obtained by imaging a second color chart, which is a printed matter, including a patch serving as a prescribed color, the third step is a step of causing, for example, by using color information on the color obtained by imaging the second color chart in the imaging data and color information on the color in the color chart in the imaging data, the color in the second color chart to be displayed on the display unit in imaging data that is obtained by displaying thereafter the second color chart on the display unit and imaging the display unit by the imaging unit to approach or match the color in the color chart in the imaging data.

In a case where the prescribed image includes a color in the color chart, the third step is a step of causing, for example, by using color information on the color in the color chart included in the prescribed image in the imaging data and color information on the color in the color chart, which is the printed matter, in the imaging data, the color in the color chart that is included in the prescribed image to be displayed on the display unit in imaging data that is obtained by displaying thereafter the prescribed image on the display unit and imaging the display unit by the imaging unit to approach or match the color in the color chart, which is the printed matter, in the imaging data.

In a case where the first step and imaging of the display unit at the second step are performed a plurality of times by changing the prescribed color, the third step is a step of correcting the color of the display unit, for example, by using color information on a plurality of prescribed colors in the imaging data acquired at the second step and color information on the color in the color chart in the imaging data.

In a case where the first step and imaging of the display unit at the second step are performed a plurality of times by changing the prescribed color, in the imaging at the second step, the color chart and the display unit may be imaged together or may be imaged individually, but imaging individually is easier.

In a case where the color chart and the display unit are imaged individually, for example, the color chart may be directly imaged by the imaging unit, whereas the display unit may be reflected in a mirror, and the display unit reflected in the mirror may be imaged by the imaging unit.

Hereinafter, the display unit color-correction method will be described in further detail.

One aspect of the display unit color-correction method will be described.

FIG. 1 illustrates a flowchart of one aspect of the display unit color-correction method. In this aspect, as a prescribed image, an image including a color that is obtained by imaging a second color chart under a standard light source is used.

[S1: Imaging of Second Color Chart]

Firstly, a second color chart is imaged (S1).

The imaging of the second color chart is normally performed by using the imaging unit of the portable communication terminal that displays a prescribed image on the display unit, at the first step.

The second color chart is imaged under the standard light source. Examples of such the standard light source can include a standard light source at a color temperature 5000K that uses the D50 light source.

When the second color chart is imaged, an imaged image is preferably prevented from causing specular reflection. Examples of a method of preventing the specular reflection can include imaging in a lighting booth Color information on a color that is obtained by imaging the second color chart under the standard light source is preferably acquired as $L^*a^*b^*$, which is compatible. At that time, because a reference white needs to be determined, color information on a color that is obtained by imaging the second color chart under the standard light source is converted into numbers in which a standard white plate is used as a white reference under the standard light source in the imaging.

Moreover, a value of the patch in the second color chart is preferably acquired by a colorimeter.

Herein, one example of a second color chart to be used in the imaging and a color chart to be used at the second step will be described.

The color chart is a plate-like object in which color samples are arranged. The color chart is used for comparison and measurement of colors, for example.

Each color sample in the color chart is referred to as a patch. In other words, the color chart includes a plurality of patches.

Hereinafter, while describing a color chart (hereinafter, referred to as a "color chart for telemedicine" in some cases) useful for telemedicine by using color information on a patient such as a skin color and a tongue color, the color chart will be also described entirely. Note that, the color chart that is used in the invention is not limited to the following color chart.

The color chart for telemedicine includes a plurality of patches.

The plurality of the patches include at least three patches that are selected from groups consisting of a first patch to a seventh patch below:

The first patch: a region including a first color that is represented by $L^*=72$, $a^*=8$, and $b^*=22$ in an $L^*a^*b^*$ value, or a color having a difference $\Delta E^*$ of 5 or less relative to the first color in the $L^*a^*b^*$color space;

The second patch: a region including a second color that is represented by $L^*=78$, $a^*=30$, and $b^*=15$ in an $L^*a^*b^*$ value, or a color having a difference $\Delta E^*$ of 5 or less relative to the second color in the $L^*a^*b^*$color space;

The third patch: a region including a third color that is represented by $L^*=58$, $a^*=27$, and $b^*=7$ in an $L^*a^*b^*$ value, or a color having a difference $\Delta E^*$ of 5 or less relative to the third color in the $L^*a^*b^*$color space;

The fourth patch: a region including a fourth color that is represented by $L^*=60$, $a^*=20$, and $b^*=5$ in an $L^*a^*b^*$ value, or a color having a difference $\Delta E^*$ of 5 or less relative to the fourth color in the $L^*a^*b^*$color space;

The fifth patch: a region including a fifth color that is represented by $L^*=48$, $a^*=25$, and $b^*=2$ in an $L^*a^*b^*$ value, or a color having a difference $\Delta E^*$ of 5 or less relative to the fifth color in the $L^*a^*b^*$color space;

The sixth patch: a region including a sixth color that is represented by $L^*=52$, $a^*=50$, and $b^*=13$ in an $L^*a^*b^*$ value, or a color having a difference $\Delta E^*$ of 5 or less relative to the sixth color in the $L^*a^*b^*$color space; and The seventh patch: a region including a seventh color that is represented by $L^*=33$, $a^*=40$, and $b^*=30$ in an L*a*b* value, or a color having a difference ΔE* of 5 or less relative to the seventh color in the L*a*b*color space.

The color included in the first patch corresponds to a color of fur of tongue on which moisture (excess water) has accumulated.

The color included in the second patch corresponds to an inflammatory skin color.

The color included in the third patch corresponds to a color of a tongue with a blood stasis (poor microcirculation).

The color included in the fourth patch corresponds to a color of a portion having healthy fur of tongue.

The color included in the fifth patch corresponds to a color of the engorgement of deep lingual vein=the blood stasis.

The color included in the sixth patch corresponds to a color of a healthy tongue.

The color included in the seventh patch corresponds to a color of a feverish tongue.

Using the color chart for telemedicine including at least three patches that are selected from the group consisting of the first patch to the seventh patch makes it easy to conduct a diagnosis that uses color information such as a skin color and a tongue color of a patient.

The color chart for telemedicine includes at least three patches that are selected from the group consisting of the first patch to the seventh patch, preferably includes at least five patches, and more preferably includes seven patches.

The combination of these first to seventh patches is not specially limited as long as it is three patches or more that are selected from the seven patches, but preferably includes three patches or more having different color tones such as purplish red, violet, and deep yellowish red.

The color chart for telemedicine may include a patch other than the patches from the first patch to the seventh patch. Such a patch can include an achromatic patch, a chromatic patch, or the like.

The plurality of patches include, for example, a plurality of achromatic patches having different lightness. The types of the achromatic patches can include five to seven types, for example. In a case where the types of the achromatic patches are three types or less, for example, when color correction is performed on an image in which a color chart (not limited to a color chart for telemedicine) is imaged by using achromatic patches, the color-correction cannot sufficiently correspond to the non-linearity of an imaging device (for example, a camera of a smartphone), and the accuracy of the color-correction is lowered in some cases. In that regard, the types of the achromatic patches are preferably five types or more.

The plurality of patches include, for example, a plurality of chromatic patches different from the first color to the seventh color. The types of these chromatic patches can include 15 to 20 types, for example.

The size of each patch in the color chart for telemedicine is not specially limited, but is preferably not too small in the point that each patch does not interfere with the recognition of the color. In that regard, the size is preferably 0.25 cm$^2$ or more. Moreover, the size is preferably 4 cm$^2$ or less in the point that the color chart is prevented from becoming excessively large.

The shape of each patch can include a square, for example.

The color chart (not limited to the color chart for telemedicine) preferably includes an automatic recognition marker for automatically recognizing at least one of a plurality of patches. The color chart includes the automatic recognition marker, so that work of recognizing each patch in the color chart in image data can be automatically performed when the color-correction, which is described later, is performed.

The shape and the size of the automatic recognition marker are not specially limited, but the shape and the size are preferably the same as those of the patch, for example. For example, the size of the automatic recognition marker is preferably 0.25 cm$^2$ or more and 4 cm$^2$ or less. Moreover, the automatic recognition marker normally includes a pattern that each patch does not include.

The color chart preferably includes two or more automatic recognition markers having different patterns. In a case where two or more automatic recognition markers are used, the automatic recognition of each patch is performed by considering a relative positional relation among the two or more automatic recognition markers, so that the automatic recognizability of each patch is improved.

The automatic recognition marker is not specially limited as long as it is a maker that enables the automatic recognition, and information such as version information on the color chart, a link to the use method, and an expiration date for use may be added to the automatic recognition marker with a two-dimensional bar code and the like. Note that, the color chart fades depending on a storage state in some cases. In that regard, an expiration date for use is preferably set for the color chart in some cases.

Herein, one example of a method of automatically recognizing each patch in a color chart by using an automatic recognition marker will be described.

Firstly, an automatic recognition marker is detected among images obtained by imaging the color chart. The automatic recognition marker can be detected by using an image recognition device that is provided with general-purpose image recognition processing software, for example. Specifically, pattern matching between an image of an automatic recognition marker stored in advance in the image recognition device and an image obtained by imaging the color chart is performed by using the image recognition device, thereby detecting the automatic recognition marker among the images obtained by imaging the color chart.

Meanwhile, a positional relation between the automatic recognition marker and each patch in the color chart is stored in advance in the image recognition device. For example, in a case where two automatic recognition markers having different patterns are used, a positional relation between each of the two automatic recognition markers and each patch is stored in advance in a storage unit of the image recognition device. Herein, the image recognition device can include a combination of a CPU and a memory.

Further, by using the detected automatic recognition marker, the already grasped positional relation is applied to the color chart of the image obtained resulting from the imaging, whereby each patch in the color chart of the image obtained resulting from the imaging can be automatically recognized.

The size of the color chart is not specially limited, but in a case of a color chart for telemedicine, the area of the color chart for telemedicine is preferably 40 cm$^2$ or more and 150 cm$^2$ or less in the point that the color chart can be held by a single hand and does not interfere when being held near a face.

The color chart normally has a sheet shape. Further, the shape of a main surface of the color chart is a rectangle, for example.

The material for the color chart is not specially limited as long as each patch can be printed thereon, and may be made of plastic resin (for example, synthetic paper) or may be made of paper, for example.

The color chart for telemedicine preferably includes a blank portion in a right lower portion (left lower portion viewed from the front surface) of the main surface. Many persons are right-handed. Therefore, when the relevant blank portion of the color chart for telemedicine is held by a right hand, the color chart for telemedicine is likely to be naturally arranged at the right side of the face.

Herein, one example of a color chart for telemedicine will be described by using the drawings.

Figure 2:
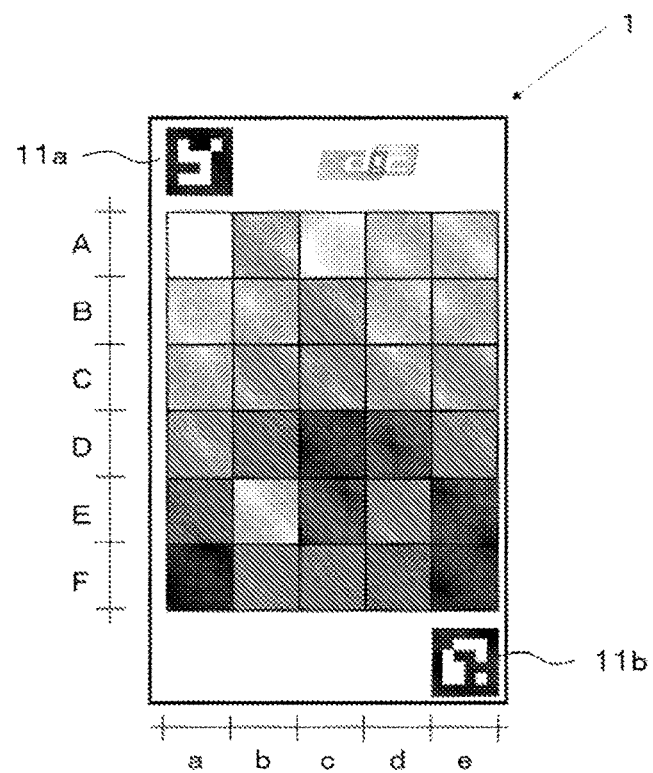
FIG. 2 is a schematic diagram of one example of a color chart for telemedicine.

FIG. 2 is a schematic diagram of one example of a color chart for telemedicine.

Note that, the color chart for telemedicine in FIG. 2 uses a gray scale, however, the actual color chart for telemedicine includes a chromatic patch.

The color chart for telemedicine in FIG. 2 is a rectangle of approximately 90 mm long and approximately 55 mm wide, and includes automatic recognition markers 11a and 11b of 10 mm square, which are respectively disposed on a right upper portion (left upper portion viewed from the front surface) in an upper part and a left lower portion (right lower portion viewed from the front surface) in a lower part of the main surface. The two automatic recognition markers 11a and 11b each have a white pattern on a black ground. The white pattern of the automatic recognition marker 11a is different from the white pattern of the automatic recognition marker 11b. In a center part sandwiched between the upper and lower parts, patches each having 10 mm square are arranged in 6 (A to F) rows and 5 (a to e) columns without being spaced. In the rightmost column (first column: in the leftmost column viewed from the front surface) on the main surface, achromatic patches are arranged in order of the lightness.

Table 1-1 illustrates L*a*b*values of respective patches in the color chart for telemedicine that is illustrated in FIG. 2. Moreover, Table 1-2 approximately illustrates colors of the respective patches in the color chart illustrated in FIG. 2. Moreover, Table 1-3 illustrates a relation between the skin color or the tongue color and each of the first patch to the seventh patch.

TABLE 1-1

|   | a | | | b | | | c | | | d | | | e | | |
| --- | --- | --- | --- | --- | --- | --- | --- | --- | --- | --- | --- | --- | --- | --- | --- |
|   | L* | a* | b* | L* | a* | b* | L* | a* | b* | L* | a* | b* | L* | a* | b* |
| A | 97 | 0 | 0 | 62 | 38 | 55 | 82 | 6 | 74 | 72 | 22 | 62 | 72 | 8 | 22 |
| B | 87 | 0 | 0 | 70 | −30 | −4 | 51 | −21 | −30 | 78 | 30 | 15 | 67 | 20 | 14 |
| C | 76 | 0 | 0 | 55 | 14 | −30 | 51 | 0 | −25 | 60 | 20 | 5 | 58 | 27 | 7 |
| D | 64 | 0 | 0 | 40 | 14 | −47 | 28 | 24 | −55 | 30 | 27 | −26 | 48 | 25 | 2 |
| E | 51 | 0 | 0 | 73 | −22 | 54 | 50 | 54 | −18 | 52 | 50 | 13 | 42 | 57 | 24 |
| F | 36 | 0 | 0 | 56 | −37 | 30 | 43 | −12 | 18 | 38 | 17 | 12 | 33 | 40 | 30 |

TABLE 1-2

|   | a | b | c | d | e |
| --- | --- | --- | --- | --- | --- |
| A | White | Orange | Yellow | Light orange | Dark yellow red (First patch) |
| B | Extremely light gray | Bright grayish green | Sky blue | Light red (Second patch) | Light yellowish red |
| C | Light gray | Purple | Grayish blue | Purplish red (Fourth patch) | Purplish red (Third patch) |

TABLE 1-2-continued

|   | a | b | c | d | e |
| --- | --- | --- | --- | --- | --- |
| D | Gray | Purplish blue | Iron blue | Purple | dark purplish red (Fifth patch) |
| E | Deep gray | Yellowish green | Pink | Bright red (Sixth patch) | Red |
| F | Black | Dark Green | Dark yellowish green | Dark yellowish red | Deep yellowish red (Seventh patch) |

TABLE 1-3

|   | a | b | c | d | e |
| --- | --- | --- | --- | --- | --- |
| A |   |   |   |   | Color of fur of tongue on which moisture (excess water) has accumulated (First patch) |
| B |   |   |   | Inflammatory skin color (Second patch) |   |
| C |   |   |   | Color of portion having healthy fur of tongue (Fourth patch) | Color of tongue of blood stasis (poor microcirculation) (Third patch) |
| D |   |   |   |   | Engorgement of deep lingual vein = color of blood stasis (Fifth patch) |
| E |   |   |   | Color of healthy tongue (Sixth patch) |   |
| F |   |   |   |   | Color of feverish tongue (Seventh patch) |

[S2: Display Image on Display Unit (First Step)]

Next, a prescribed image obtained at Step S1, in other words, a prescribed image including a color that is obtained by imaging a second color chart under a standard light source, is caused to be displayed on the display unit of the portable communication terminal (S2).

The prescribed image may be an image obtained by imaging the second color chart without any change, or may be an image obtained by processing the image obtained by imaging the second color chart if necessary. Examples of the processing can include processing of reducing the image obtained by imaging the second color chart, and changing the surrounding to a black background.

Figure 3:
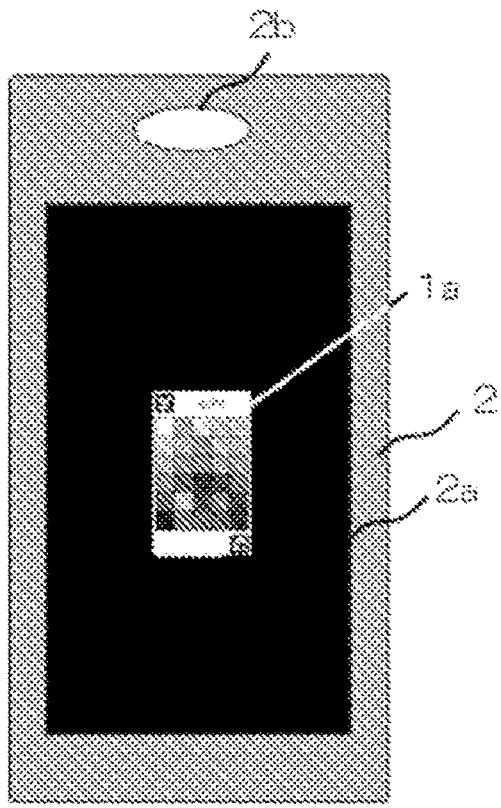
FIG. 3 is a schematic diagram of a prescribed image including the color chart for telemedicine displayed on a display of a smartphone.

FIG. 3 illustrates a schematic diagram in which a prescribed image including a color chart for telemedicine is displayed on the display unit of the portable communication terminal.

In FIG. 3, a prescribed image including a color chart for telemedicine 1a, which is a second color chart imaged in advance, is displayed on a display 2a, which is a display unit of a smartphone 2, which is a portable communication terminal. In the prescribed image, the color chart for telemedicine 1a is approximately 10% of the area of the entire prescribed image, and the other portion excluding the color chart for the remote diagnosis 1a is displayed black. This can decrease the light emission amount of the display unit that emits spontaneous light, and as a result, affecting a color tone of the imaging data by the spontaneous light can be reduced.

[S3: Imaging of Color Chart And Display Unit (Second Step)]

Next, a color chart, which is a printed matter, and the display unit are together reflected in a mirror, and the color chart, which is the printed matter, and the display unit reflected in the mirror are imaged by the imaging unit, thereby acquiring imaging data (S3).

Figure 4:
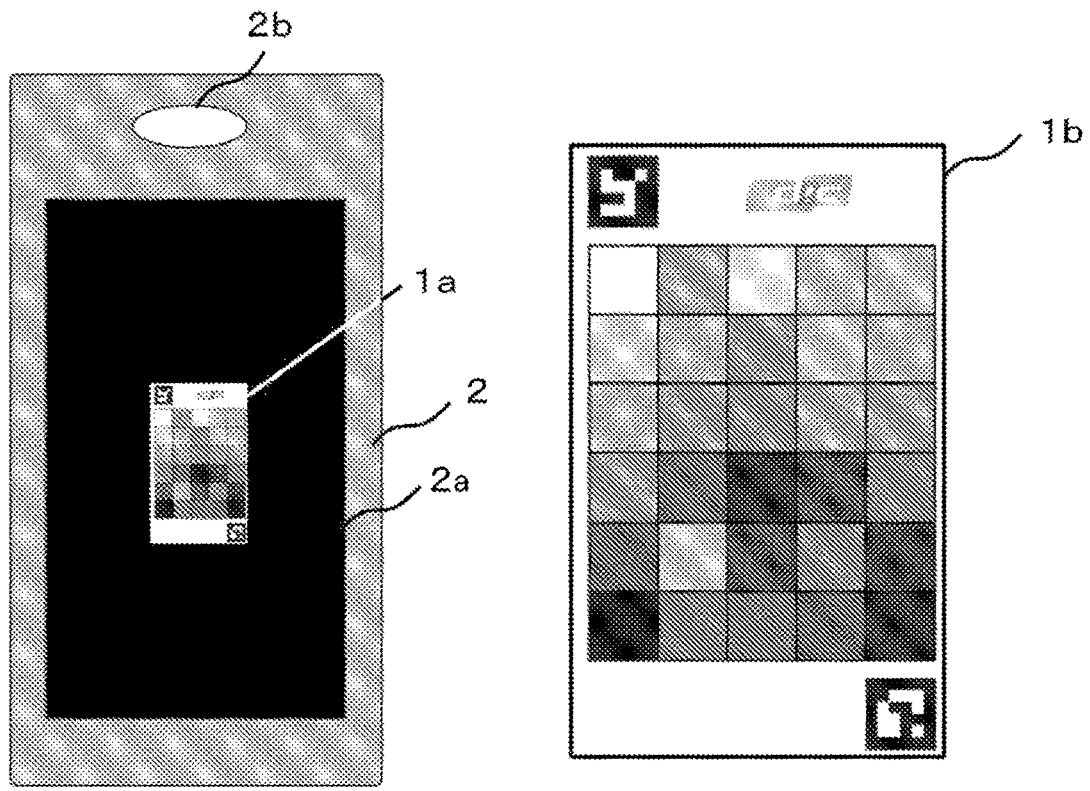
FIG. 4 is a schematic diagram in which the color chart for telemedicine and the smartphone are arranged side by side.
Figure 5:
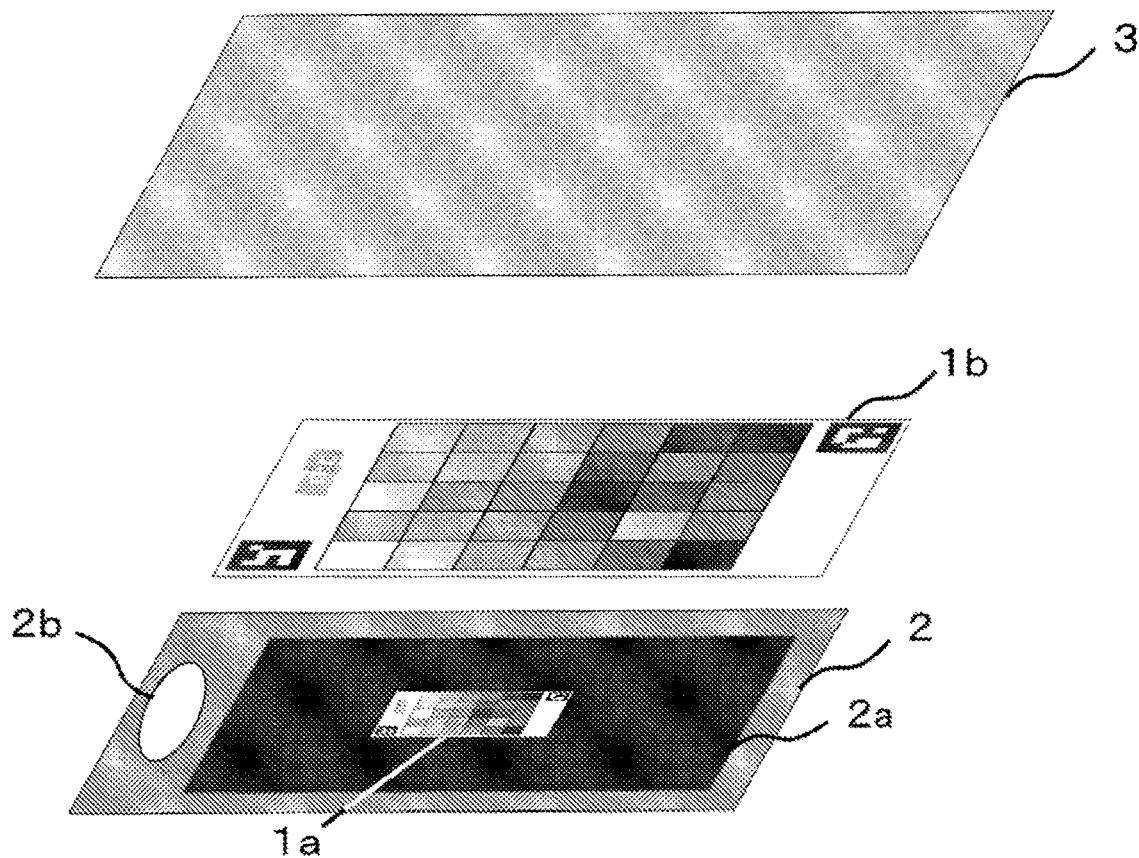
FIG. 5 is a schematic diagram in which a mirror is disposed so as to be opposed to the color chart for telemedicine and the smartphone arranged side by side.

At this step, for example, as in FIG. 4, a color chart for telemedicine 1b, which is a printed color chart, and the smartphone 2, which is a portable communication terminal, are arranged side by side such that a front surface of the color chart for telemedicine 1b and a surface of the display 2a, which is a display unit, face in the same direction. At this time, an image including the color chart for telemedicine 1a is displayed on the display 2a. Further, a mirror 3 is disposed so as to be opposed to those (FIG. 5). Further, the color chart for telemedicine 1b and the display 2a reflected in the mirror 3 are imaged by an in-camera 2b, which is the imaging unit of the smartphone.

Note that, the color information on the color in the color chart is preferably acquired as L*a*b*, which is compatible.

In the portable communication terminal of some types, when the imaging unit performs imaging, an image during the imaging is displayed on the display unit in some cases. However, the setting of the portable communication terminal is changed to allow an arbitrary image to be displayed on the display unit when the imaging unit performs the imaging. For example, in a case where the portable communication terminal is a smartphone, a tablet terminal, or the like, when the imaging unit performs the imaging, an application that allows an arbitrary image to be displayed on the display unit may be used. Moreover, such an application may be an existing application, or may be a self-made application. The application can be made by using, for example, SWIFT (registered trademark) that is an opensource language, in a case where an application for a smartphone made of Apple Inc. is made.

The imaging is preferably performed under a specific illumination environment, and is preferably performed under the same illumination environment as an illumination environment when an observer observes an image displayed on the display unit while keeping the color chart on hand, for example. Examples of such an illumination environment can include an illumination environment at a color temperature 5000K by using the D50 light source.

[S4: Correction of Display Unit (Third Step)]

Next, a color of the display unit is corrected by using color information on the prescribed image in the imaging data and color information on the color in the color chart in the imaging data (S4). Herein, color information on a color that is obtained by imaging the second color chart under the standard light source in the imaging data and color information on the color in the color chart in the imaging data are used, and a color in the second color chart to be displayed on the display unit in imaging data that is obtained by displaying thereafter the second color chart on the display unit and imaging the display unit by the imaging unit, is caused to approach or match the color in the color chart in the imaging data.

The imaging data includes color information on the patch in the color chart, and color information on the patch in the second color chart displayed on the display unit. Therefore, both of the color information are used, and the color of the display unit is corrected such that color information on the patch in the second color chart to be displayed on the display unit in the imaging data that is obtained by displaying thereafter the second color chart on the display unit and imaging the display unit by the imaging unit may approach or match color information on the corresponding patch in the color chart in the imaging data.

Specifically, color information on the color in the second color chart when being input into the display unit and color information on the color in the second color chart in the imaging data obtained resulting from the imaging by the imaging unit are used to acquire a relation between the input into the display unit and the output from the display unit obtained resulting from the imaging by the imaging unit, which is a relation related to the color in the second color chart. Further, the acquired relation is used, and the color of the patch in the second color chart in imaging data that is obtained by displaying thereafter the second color chart on the display unit and imaging the display unit by the imaging unit is caused to approach or match color information on the patch in the color chart in the imaging data obtained resulting from the imaging by the imaging unit.

For example, a case where color information on a given patch in the second color chart when being input into the display unit is an RGB value (120, 0, 0), and color information on the given patch in the second color chart in the imaging data obtained resulting from the imaging by the imaging unit is an RGB value (122, 3, 3) is considered. In that case, when the RGB value (122, 3, 3) needs to be obtained in the imaging data obtained resulting from the imaging by the imaging unit, an RGB value to be input into the display unit may be set to (120, 0, 0). Herein, a case where color information (input color information) on a given patch in the second color chart is an RGB value (120, 0, 0) when being input into the display unit, and color information (imaging color information) on the given patch in the second color chart in the imaging data obtained resulting from the imaging by the imaging unit is an RGB value (122, 3, 3) is used as an example. In that case, when color information on the given patch in the color chart in the imaging data is an RGB value (122, 3, 3), in order to correct the color of the display unit such that color information on the corresponding patch in the relevant second color chart in the imaging data that is obtained by displaying thereafter the second color chart on the display unit and imaging the display unit by the imaging unit is caused to approach or match the RGB value (122, 3, 3), the relation between the input color information and the imaging color information may be used to cause color information on the corresponding patch in the second color chart that is input into the display unit to approach or match the RGB value (120, 0, 0).

Note that, it is important herein that when the color of the display unit is corrected, the color of the second color chart (the color chart for telemedicine 1a) that is thereafter displayed on the display unit is not caused to approach or match the color (the color of the patch itself) in the color chart (the color chart for telemedicine 1b) that is placed next to the smartphone 2, but is caused to approach or match the color in the color chart (the color chart for telemedicine 1b) in the imaging data that is obtained resulting from the imaging by the imaging unit (camera). Herein, the imaging unit (the in-camera 2b) corresponds to eyes of a person. Therefore, both of the second color chart (the color chart for telemedicine 1a) that is displayed on the display unit and serves as a correction target and the color chart (the color chart for telemedicine 1b) that serves as a reference of the correction are imaged by the imaging unit (the in-camera 2b) corresponding to the eyes of the person, so that when the observer has observed the second color chart (the color chart for telemedicine 1a) after the correction that is displayed on the display 3 (display unit) of the smartphone 2 and the color chart (the color chart for telemedicine 1b) placed next to the smartphone 2 being arranged side by side, the color in the color chart for telemedicine 1a approaches or matches the color in the color chart for telemedicine 1b.

Subsequently, the display unit color-correction method in another aspect will be described.

Figure 6:
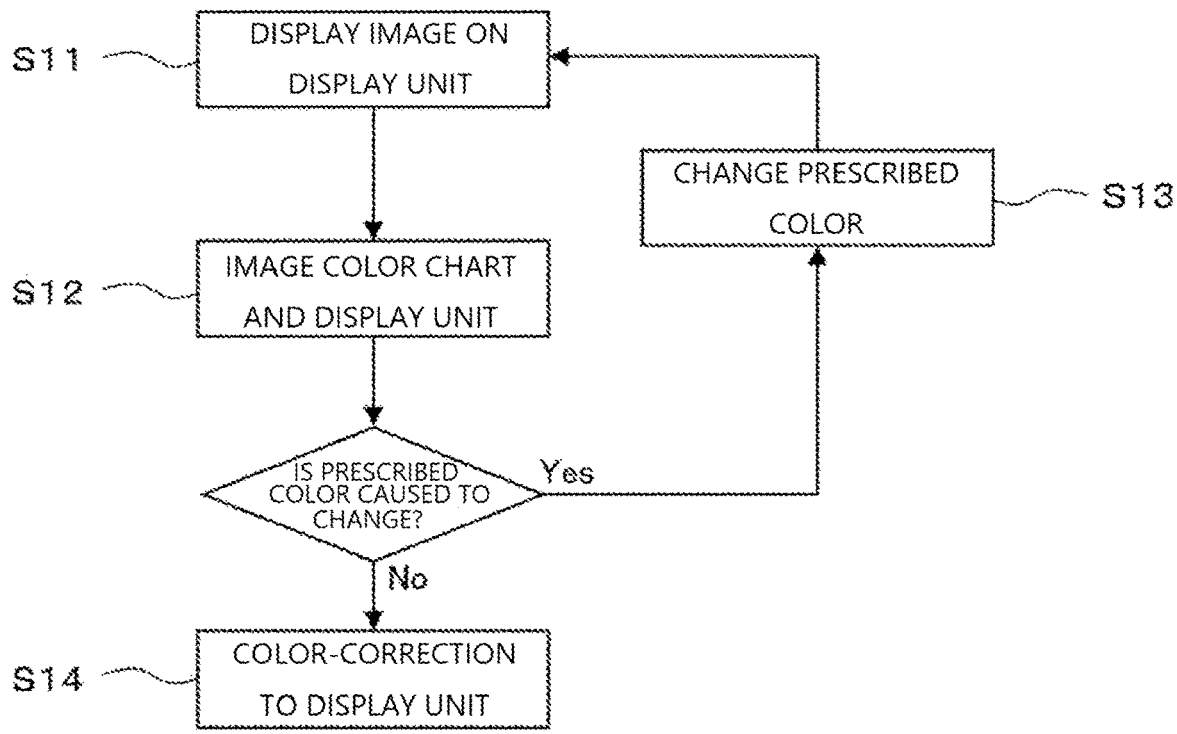
FIG. 6 is a flowchart of another example of the display unit color-correction method.

FIG. 6 illustrates a flowchart of the display unit color-correction method in another aspect. In this aspect, an image including a prescribed color is used as a prescribed image. Further, the prescribed color is changed, and a first step and a second step are performed a plurality of times.

[S11: Display Image on Display Unit (First Step)]

Firstly, a prescribed image including a prescribed color is caused to be displayed on the display unit of the portable communication terminal (S11).

Figure 7:
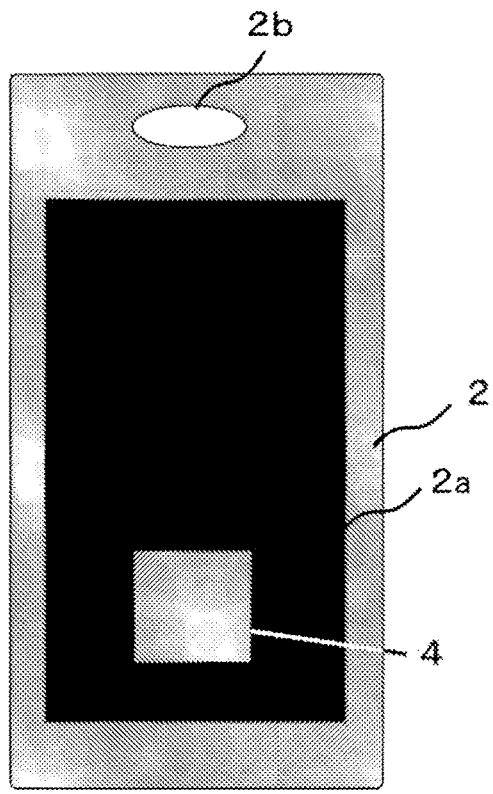
FIG. 7 is a schematic diagram of a prescribed image including a prescribed color displayed on the display of the smartphone.

FIG. 7 illustrates one example in which a prescribed image including a prescribed color 4 is caused to be displayed on the display 2a, which is the display unit of the smartphone 2, which is a portable communication terminal. In the prescribed image, the prescribed color 4 is approximately 10% of the area of the entire prescribed image, and the other portion excluding the prescribed color 4 is displayed black. This can decrease the light emission amount of the display unit that emits spontaneous light, and as a result, affecting a color tone of the imaging data by the spontaneous light can be reduced.

The prescribed color 4 in the prescribed image is specified by an RGB value, for example.

[S12: Imaging of Color Chart And Display Unit (Second Step)]

Next, a color chart, which is a printed matter, and the display unit are imaged by the imaging unit, thereby acquiring imaging data (S12).

Figure 8:
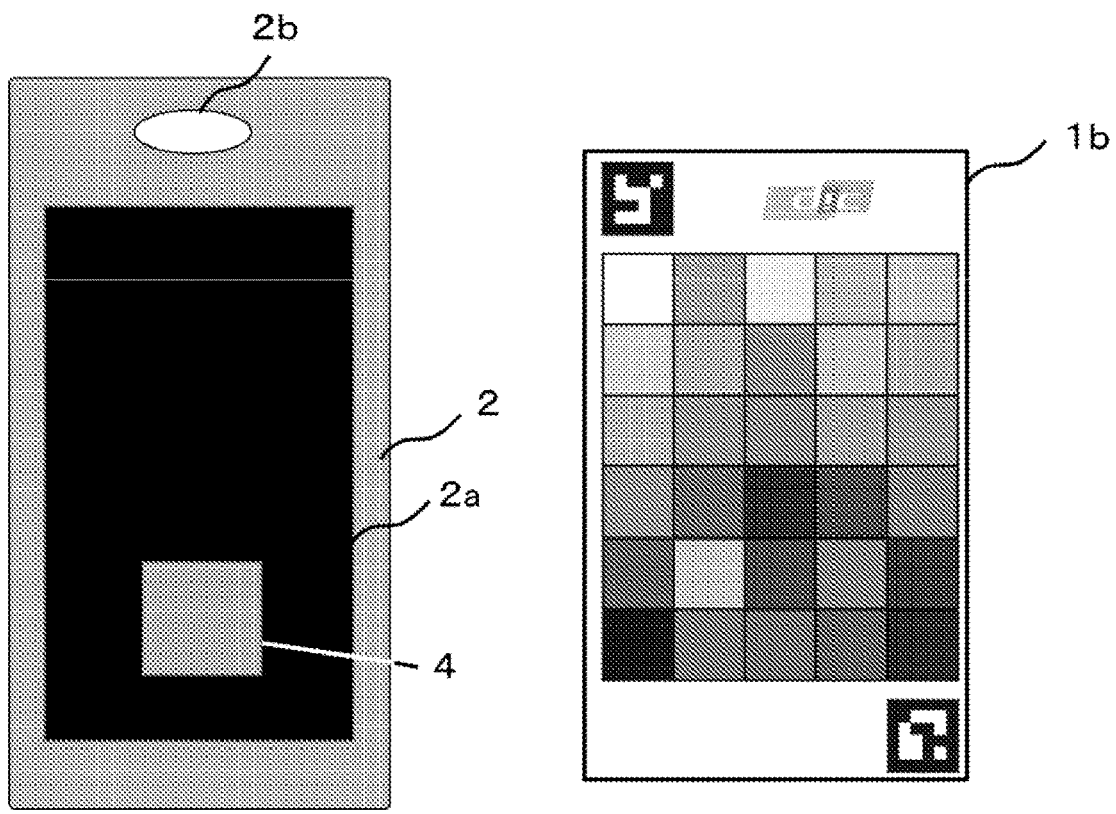
FIG. 8 is a schematic diagram in which the color chart for telemedicine and the smartphone are arranged side by side.
Figure 9:
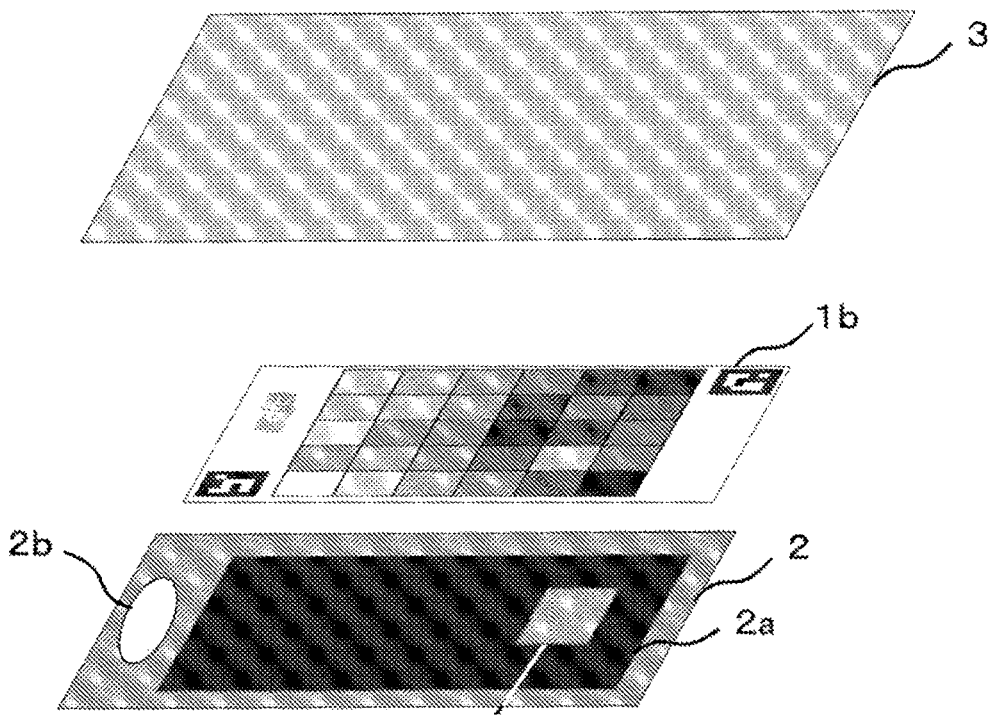
FIG. 9 is a schematic diagram in which the mirror is disposed so as to be opposed to the color chart for telemedicine and the smartphone arranged side by side.

At this step, for example, as in FIG. 8, the color chart for telemedicine 1b, which is a printed color chart, and the smartphone 2, which is a portable communication terminal, are arranged such that the front surface of the color chart for telemedicine 1b and the surface of the display 2a, which is a display unit, face in the same direction. At this time, an image including the color chart for telemedicine 1a is displayed on the display 2a. Further, the mirror 3 is disposed so as to be opposed to those (FIG. 9). Further, the color chart for telemedicine 1b and the display 2a reflected in the mirror 3 are imaged by the in-camera 2b, which is the imaging unit of the smartphone.

Note that, at the second step in the embodiment, as illustrated in FIG. 9, the color chart, which is the printed matter, and the display unit are imaged together, but the color chart, which is the printed matter, and the display unit may be individually imaged.

Moreover, in the embodiment, the mirror is used in the imaging, but the mirror does not need to be used. For example, an external camera, which is connected to the portable communication terminal, may be used as the imaging unit. Further, the display unit may be imaged by the external camera.

[S13: Change in Prescribed Color]

In this aspect, a prescribed color is changed, and the first step and the second step are performed a plurality of times, respectively.

Therefore, in this aspect, whither the prescribed color is changed is determined after the second step. At the determination, if it has been determined that the prescribed color is changed, the prescribed color is changed. Further, the first step and the second step are performed by using the prescribed color after the change.

The prescribed color is changed as follows, for example. Herein, a prescribed color specified by the RGB value is changed.

A prescribed color to be set at the beginning is set as RGB value=(0, 0, 0).

Further, R of the RGB value is slightly changed to change the prescribed color.

Specifically, at the first change in the prescribed color, the R value is increased by 7 to obtain (7, 0, 0).

Next, at the second change in the prescribed color, the R value is further increased by 8 to obtain (15, 0, 0).

Increasing the R value by 8 is performed until the R value becomes 255, which is the maximum value.

Subsequently, the G value of the RGB value is slightly changed to change the prescribed color.

Specifically, relative to the RGB value=(0, 0, 0), the G value is increased by 7 to obtain (0, 7, 0).

Next, the G value is further increased by 8 to obtain (0, 15, 0).

Increasing the G value by 8 is performed until the G value becomes 255, which is the maximum value.

Subsequently, the B value of the RGB value is slightly changed to change the prescribed color.

Specifically, relative to the RGB value=(0, 0, 0), the B value is increased by 7 to obtain (0, 0, 7).

Next, the B value is further increased by 8 to obtain (0, 0, 15).

Increasing the B value by 8 is performed until the G value becomes 255, which is the maximum value.

As in the foregoing, after the prescribed color is changed, the first step and the second step are performed relative to each prescribed color, so that a plurality of imaging data can be obtained.

[S14: Correction of Display Unit (Third Step)]

Next, a color of display unit is corrected by using color information on the prescribed image in the imaging data and color information on the color in the color chart in the imaging data (S14). Herein, information on the plurality of prescribed colors in the imaging data acquired at the second step, and information on the color in the color chart in the imaging data are used, and the color of the display unit is corrected.

Specifically, color information on a plurality of prescribed colors when being input into the display unit, and color information on a plurality of prescribed colors in the imaging data obtained resulting from the imaging by the imaging unit are used, and a relation between the input into the display unit and the output from the display unit obtained resulting from the imaging by the imaging unit that is a relation related to the prescribed colors is acquired. Further, the acquired relation is used, and the color in the color chart in the imaging data that is obtained by displaying the color chart on the display unit and imaging the display unit by the imaging unit is caused to approach or match the color in the color chart in the imaging data obtained resulting from the imaging by the imaging unit.

For example, a case where color information on the prescribed color when being input into the display unit is an RGB value (120, 0, 0), and color information on the prescribed color in the imaging data obtained resulting from the imaging by the imaging unit is an RGB value (122, 3, 3) is considered. In that case, when the RGB value (122, 3, 3) needs to be obtained in the imaging data obtained resulting from the imaging by the imaging unit, an RGB value to be input into the display unit may be set to (120, 0, 0). Herein, a case where color information (input color information) on the prescribed color when being input into the display unit is an RGB value (120, 0, 0), and color information (imaging color information) on the prescribed color in the imaging data obtained resulting from the imaging by the imaging unit is an RGB value (122, 3, 3) is used as an example. In that case, when color information on a given patch in the color chart in the imaging data is an RGB value (122, 3, 3), in order to correct the color of the display unit such that color information on the corresponding patch in the color chart in the imaging data that is obtained by displaying the color chart on the display unit and imaging the display unit by the imaging unit is caused to approach or match the RGB value (122, 3, 3), the relation between the input color information and the imaging color information may be used to cause color information on the corresponding patch in the color chart that is input into the display unit to approach or match the RGB value (120, 0, 0).

Note that, it is important herein that when the color of the display unit is corrected, the color in the color chart that is displayed on the display unit is not caused to approach or match the color (the color of the patch itself) in the color chart (the color chart for telemedicine 1b) that is placed next to the smartphone 2, but is caused to approach or match the color in the color chart (the color chart for telemedicine 1b) in the imaging data that is obtained resulting from the imaging by the imaging unit (camera). Herein, the imaging unit (the in-camera 2b) corresponds to eyes of a person. Therefore, both of the color chart that is displayed on the display unit and serves as a correction target and the color chart (the color chart for telemedicine 1b) that serves as a reference of the correction are imaged by the imaging unit (the in-camera 2b) corresponding to the eyes of the person, so that when the observer has observed the color chart after the correction that is displayed on the display 3 (display unit) of the smartphone 2 and the color chart (the color chart for telemedicine 1b) placed next to the smartphone 2 being arranged side by side, the color in the color chart displayed on the display 3 (display unit) approaches or matches the color in the color chart for telemedicine 1b.

In this aspect, the prescribed color is used in order to correct the color of the display unit. Further, in this aspect, many prescribed colors can be prepared. Many prescribed colors are prepared to increase the number of calibration data, so that the accuracy of the color-correction can be enhanced, as a result.

For example, in the abovementioned example at S13, as a plurality of prescribed colors, color information on [(256/8)+1]×[(256/8)+1]×[(256/8)+1]=33×33×33=35937 colors is used. Therefore, a large number of color information (input color information and imaging color information) to be compared for the correction can be obtained. On the other hand, in the display unit color-correction method illustrated in the flowchart of FIG. 1, the number of color information to be compared corresponds to the number of patches, and the number of color information to be compared in the case of the color chart of FIG. 2 is 30. Therefore, the display unit color-correction method illustrated in the flowchart of FIG. 10 can enhance the accuracy more than the display unit color-correction method illustrated in FIG. 1.

In the one aspect described with reference to FIG. 6, the color chart and the display unit are imaged together, but the color chart and the display unit may be imaged separately. In that case, for example, the color-correction to the display unit is performed in accordance with the flowchart illustrated in FIG. 10.

Figure 10:
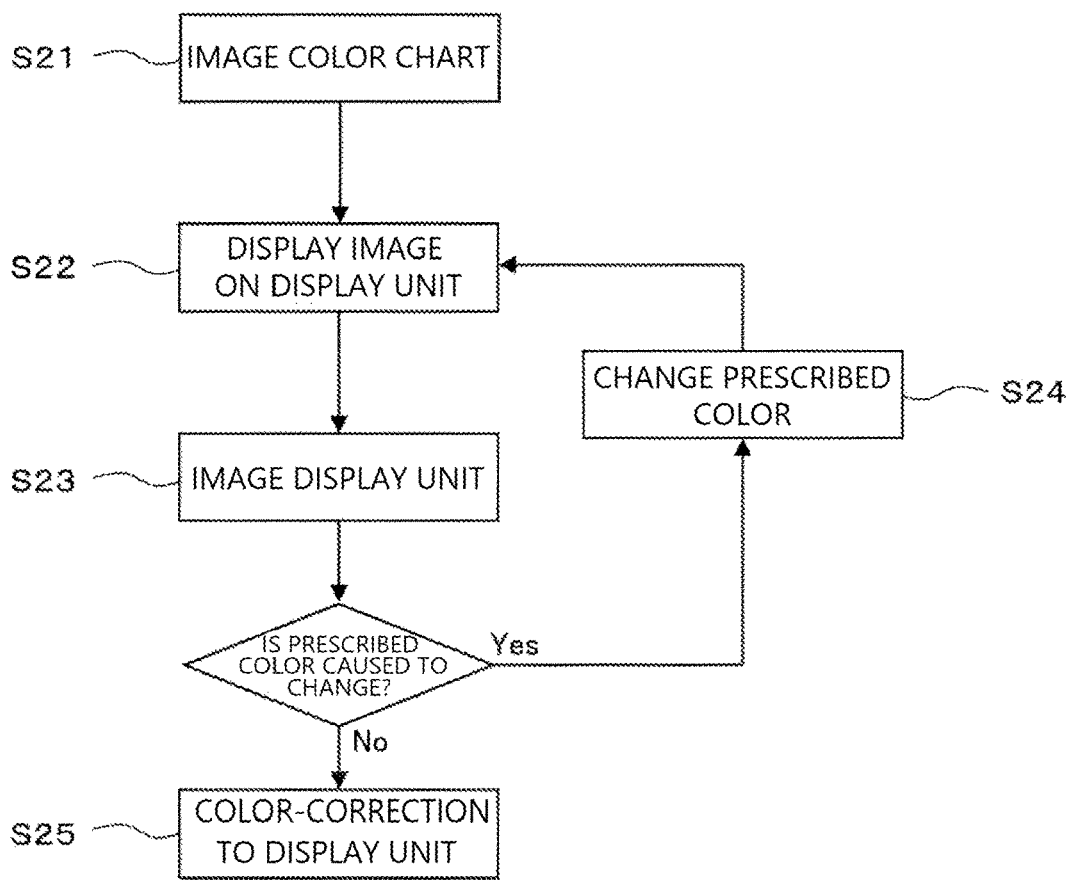
FIG. 10 is a flowchart of another example of the display unit color-correction method.

FIG. 10 illustrates a flowchart of the display unit color-correction method in another aspect.

In the flowchart illustrated in FIG. 6, the imaging of the color chart and the imaging of the display unit are performed together (S12), whereas in the flowchart illustrated in FIG. 10, the imaging of the color chart (S21) and the imaging of the display unit (S23) are performed separately.

In the flowchart illustrated in FIG. 10, the other steps S22, S24, and S25 are respectively the same as the steps S11, S13, and S14 in the flowchart illustrated in FIG. 6.

The display unit color-correction method of the invention can perform the color-correction to the display unit of the portable communication terminal that is used by an observer who carries out observation by using the color chart. The color chart to be used can include, in addition to the aforementioned color chart for a remote diagnosis, a color chart for cosmetics including a skin-color patch, a color chart for crops including a patch of the color on the surface of the crop, and the like, and is not specially limited.

Herein, a remote diagnosis serving as one example in which an observer carries out observation by using a color chart will be described.

Figure 11:
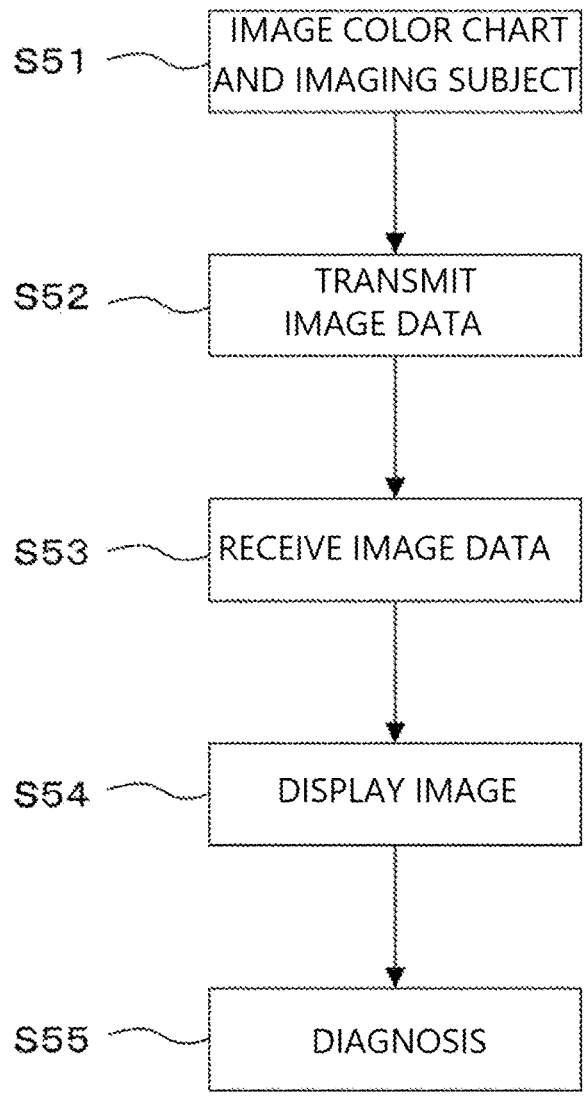
FIG. 11 is a flowchart of one example of a remote diagnosis.

FIG. 11 is a flowchart of one example of a remote diagnosis.

Figure 12:
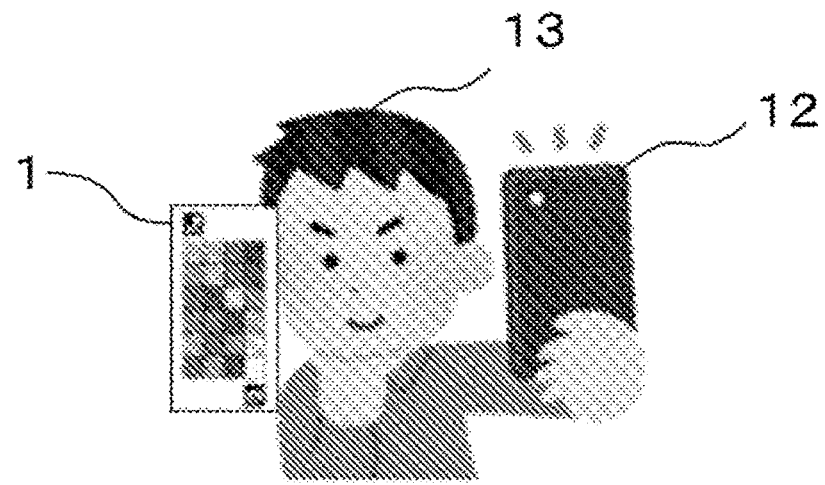
FIG. 12 is a schematic diagram in which the color chart and a patient are simultaneously imaged by a smartphone.

Firstly, as illustrated in FIG. 12, a smartphone 12, which is an imaging device is used to simultaneously image a color chart 1 and a patient 13, who is an imaging subject (S51).

Next, image data obtained resulting from the imaging is transmitted from the smartphone 12 to the smartphone 2, which is a portable communication terminal that is held by a medical doctor 14, who is an observer (S52).

Next, the smartphone 2 receives the image data transmitted from the smartphone 12 (S33). The transmission and reception are performed by attaching the image data to an E-mail, for example.

Figure 13:
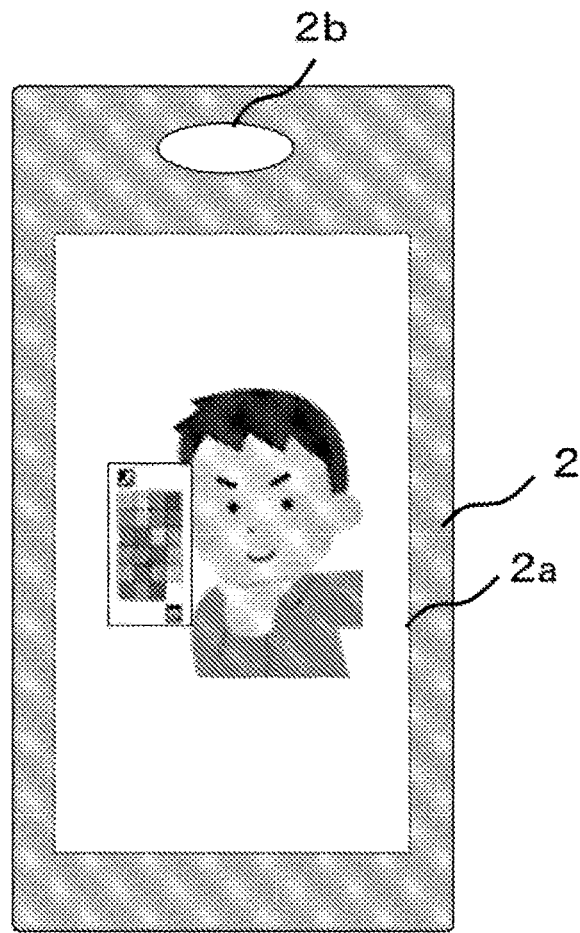
FIG. 13 is a schematic diagram in which an image obtained resulting from the imaging is displayed on the display of the smartphone.

Next, as illustrated in FIG. 13, the image data is displayed as an image on the display 2a, which is the display unit of the smartphone 2 (S54).

Figure 14:
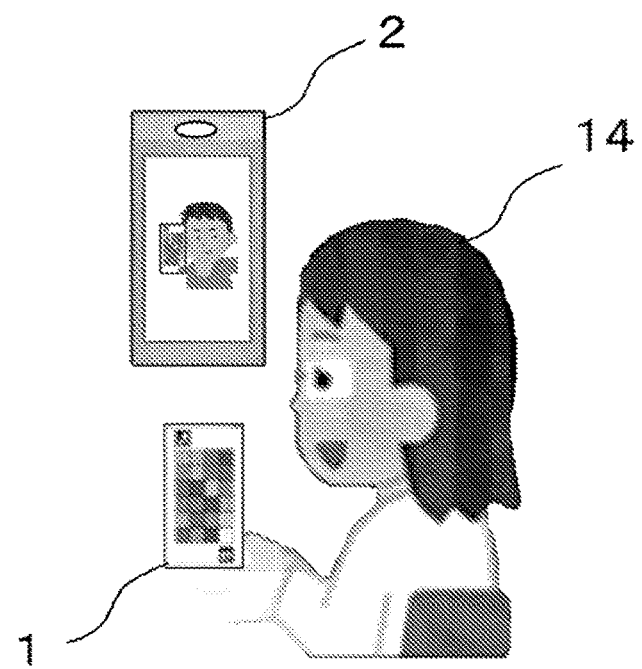
FIG. 14 is a schematic diagram in which a medical doctor performs telemedicine by displaying the image obtained by the imaging on the display.

Finally, as illustrated in FIG. 14, the medical doctor 14, who is the observer observes a skin color and a tongue color of a face of the patient 13 displayed on the display 2a, and performs a diagnosis, while holding the color chart 1 the same as the color chart 1 that is held by the patient 13, who is the imaging subject, and considering a difference between the color in the color chart 1 displayed on the display 2a and the color in the color chart 1 being held.

At this time, the display unit color-correction method of the invention is performed on the display unit of the smartphone that is held by the medical doctor, who is the observer, to attain the excellent color reproducibility of display unit, so that it is possible to enhance the accuracy of the diagnosis, as a result.

REFERENCE SIGNS LIST

1: Color chart
1a, 1b: Color chart for remote diagnosis
2: Smartphone
2a: Display 2b: In-camera
3: Mirror
4: Prescribed color
11a, 11b: Automatic recognition marker
12: Smartphone
13: patient
14: medical doctor

The invention claimed is:

1. A display unit color-correction method using a portable communication terminal, the method comprising:
   displaying a prescribed image on a display unit of the portable communication terminal;
   acquiring imaging data by imaging, with an imaging unit of the portable communication terminal, a first color chart that is a printed matter and the prescribed image on the display unit together with or individually from the first color chart;
   determining a relation between an input into the display unit and an output from the display unit based on color information on the prescribed image in the imaging data and color information on a color in the first color chart in the imaging data; and
   correcting a color of the display unit based on the relation such that a color to be displayed in imaging data obtained after correcting the color approaches or matches the color in the first color chart in the imaging data.

2. The display unit color-correction method according to claim 1, wherein
   the prescribed image includes a color obtained by imaging a second color chart that is a printed matter and includes a patch serving as a prescribed color, under a standard light source,
   the acquiring includes acquiring the imaging data by imaging the first color chart and the prescribed image on the display unit together with the first color chart, and
   the correcting includes causing a color in the second color chart to be displayed in imaging data obtained after correcting the color to approach or match the color in the first color chart in the imaging data.

3. The display unit color-correction method according to claim 2, wherein
   the acquiring includes acquiring the imaging data by reflecting on a mirror the first color chart and the prescribed image on the display unit together, and imaging the first color chart, and the display unit reflected on the mirror by the imaging unit, or
   the imaging unit is externally attached to the portable communication terminal, and the acquiring includes acquiring the imaging data by imaging, with the externally attached imaging unit, the first color chart and the prescribed image on the display unit together with the first color chart.

4. The display unit color-correction method according to claim 1, wherein
   the prescribed image includes a color included in the first color chart,
   the acquiring includes acquiring the imaging data by imaging the first color chart and the prescribed image on the display unit together with the first color chart, and
   the correcting includes causing the color included in the first color chart that is included in the prescribed image to be displayed in imaging data obtained after correcting the color to approach or match the color in the first color chart in the imaging data.

5. The display unit color-correction method according to claim 1, wherein
   the prescribed image includes a prescribed color,
   the displaying, and the imaging the prescribed image on the display unit in the acquiring are performed a plurality of times by changing the prescribed color, and
   the determining includes determining the relation based on color information on a plurality of prescribed colors in the imaging data acquired in the acquiring, and the color information on the color in the first color chart in the imaging data.

6. The display unit color-correction method according to claim 5, wherein in the acquiring, the first color chart, and the display unit are individually imaged by the imaging unit.

7. The display unit color-correction method according to claim 1, wherein
   the first color chart and the second color chart include same patches, and
   the patches have colors that respectively correspond to skin colors or tongue colors of different healthy status.

* * * * *